(12) United States Patent
Wu et al.

(10) Patent No.: US 9,884,995 B2
(45) Date of Patent: *Feb. 6, 2018

(54) LIQUID CRYSTAL COMPOSITION, LIQUID CRYSTAL DISPLAY DEVICE AND ITS MANUFACTURING METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaojuan Wu, Beijing (CN); Wei Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/094,377

(22) Filed: Apr. 8, 2016

(65) Prior Publication Data

US 2017/0081589 A1 Mar. 23, 2017

(30) Foreign Application Priority Data

Sep. 23, 2015 (CN) .......................... 2015 1 0613262

(51) Int. Cl.
*C09K 19/36* (2006.01)
*C09K 19/50* (2006.01)
(Continued)

(52) U.S. Cl.
CPC .............. *C09K 19/50* (2013.01); *C09K 19/36* (2013.01); *C09K 19/3842* (2013.01);
(Continued)

(58) Field of Classification Search
CPC ...................................................... C09K 19/38
See application file for complete search history.

(56) References Cited

U.S. PATENT DOCUMENTS

2016/0355733 A1* 12/2016 Wang ................. C09K 19/3809

FOREIGN PATENT DOCUMENTS

| CN | 1470906 A | 1/2004 |
|---|---|---|
| CN | 1501143 A | 6/2004 |

(Continued)

OTHER PUBLICATIONS

CN 102649907 A English Abstract Jan. 23, 2017.*
(Continued)

*Primary Examiner* — Chanceity Robinson
(74) *Attorney, Agent, or Firm* — Harness, Dickey & Pierce, P.L.C.

(57) ABSTRACT

The present disclosure provides a liquid crystal composition, a liquid crystal display device and its manufacturing method. The liquid crystal composition comprises a first composition and an ethylene-vinyl acetate copolymer at a ratio by mass of the first composition to the ethylene-vinyl acetate copolymer of 2:3 to 4:1, wherein the first composition comprises 15 to 40 parts by weight of a chiral cholesterol ester compound, 59 to 75 parts by weight of nematic phase liquid crystal, and 1 to 10 parts by weight of ferroferric oxide. The liquid crystal display device comprises a liquid crystal display panel, a first transparent electrode, a liquid crystal composition layer, and a second transparent electrode.

18 Claims, 3 Drawing Sheets

(51) Int. Cl.
    *C09K 19/38*     (2006.01)
    *C09K 19/54*     (2006.01)
    *G02F 1/1343*     (2006.01)
    *G02B 27/22*     (2006.01)
    *H04N 13/00*     (2006.01)
    *C09K 19/52*     (2006.01)
    *G02F 1/1333*     (2006.01)
    *G02F 1/137*     (2006.01)

(52) U.S. Cl.
    CPC .............. *C09K 19/54* (2013.01); *G02B 27/22* (2013.01); *G02F 1/13439* (2013.01); *H04N 13/00* (2013.01); *C09K 2019/521* (2013.01); *G02F 1/133365* (2013.01); *G02F 2001/13775* (2013.01)

(56) References Cited

FOREIGN PATENT DOCUMENTS

| | | | |
|---|---|---|---|
| CN | 1503037 A | | 6/2004 |
| CN | 102643432 A | * | 8/2012 |
| CN | 102643432 A | | 8/2012 |
| CN | 102649907 A | * | 8/2012 |
| CN | 104914588 A | * | 9/2015 |
| CN | 104914588 A | | 9/2015 |

OTHER PUBLICATIONS

First Office Action regarding Chinese application No. 201510613262.X, dated Dec. 23, 2016. Translation provided by Dragon Intellectual Property Law Firm.

* cited by examiner

LIQUID CRYSTAL COMPOSITION, LIQUID CRYSTAL DISPLAY DEVICE AND ITS MANUFACTURING METHOD

CROSS-REFERENCE TO RELATED APPLICATION

This application claims priority to Chinese Patent Application No. 201510613262.X filed on Sep. 23, 2015, the entire contents of which are incorporated herein by reference.

TECHNICAL FIELD

The present disclosure relates to the field of liquid crystal display, and in particular to a liquid crystal composition, a liquid crystal display device and its manufacturing method.

BACKGROUND

Liquid crystal displays are more and more widely used in modern life, such as a cell phone display, a laptop display, a GPS display, a LCD TV display, etc. Traditional displays could display plane images only, and could no longer meet the requirements of the display quality. 3D displays could display a stereo realistic image without being limited to the plane of a screen, and provide a viewer with immersive experience. Thus 3D displays are widely studied.

3D display devices could be divided into glass-type ones and naked-eye ones. The former requires a viewer to wear 3D glasses to watch, and a viewer will see blurred images if the view will not wear 3D glasses. The naked-eye 3D display devices are widely used due to no need of wearing glasses.

The naked-eye 3D liquid crystal display devices may be divided into barrier-type ones and lens-type ones. The former are compatible with such as a liquid crystal display screen or a flat display screen of an organic electroluminescent screen, and thus are widely studied.

For a barrier-type naked-eye 3D liquid crystal display device, a layer of twisted nematic liquid crystal (TN liquid crystal) grating is usually overlaid on a light-exiting surface of the display panel. Although this technology is a mature, low-cost technology, and could achieve switch between 2D and 3D modes, it is required to overlay a layer of substrate on the liquid crystal display panel, which results in that the whole module is thicker, the transmittance in 2D display is lower and the display effect is affected.

Therefore, it is required to provide a thinner liquid crystal display device which could achieve switch between 2D and 3D modes, so as to improve the display effect.

SUMMARY

The present disclosure provides a liquid crystal composition, a liquid crystal display device and its manufacturing method. The liquid crystal composition according to the present disclosure can be directly coated on a first transparent electrode etched on a light-exiting surface of a substrate of the liquid crystal display panel, without the need of further addition of other substrates, thus reducing the thickness of the liquid crystal display device and improving transmittance and display effect in 2D display.

According to one aspect of the present disclosure, a liquid crystal composition is provided, which comprises a first composition and an ethylene-vinyl acetate copolymer at a ratio by mass of the first composition to the ethylene-vinyl acetate copolymer of 2:3 to 4:1;

wherein the first composition comprises 15 to 40 parts by weight of a chiral cholesterol ester compound, 59 to 75 parts by weight of nematic phase liquid crystals and 1 to 10 parts by weight of ferroferric oxide.

Alternatively, in the liquid crystal composition according to the present disclosure, the chiral cholesterol ester compound is a compound represented by formula I:

formula I wherein n is an integer of 0 to 19, and an asterisk * denotes a chiral center.

Alternatively, in the composition according to the present disclosure, the nematic phase liquid crystal is a positive small-molecule liquid crystal.

According to another aspect of the present disclosure, a liquid crystal display device is provided, which comprises:

a liquid crystal display panel that comprises an upper substrate, a lower substrate, and a liquid crystal layer arranged between the upper substrate and the lower substrate;

a first transparent electrode that is arranged on a light-exiting surface of the upper substrate;

a liquid crystal composition layer that is arranged on the first transparent electrode and comprises the liquid crystal composition according to the present disclosure; and a second transparent electrode that is arranged on one side of a transparent substrate facing the liquid crystal composition layer and covers the liquid crystal composition layer.

Alternatively, in the liquid crystal display device according to the present disclosure, the liquid crystal composition layer is prepared by coating at least two layers of the liquid crystal composition according to the present disclosure.

Alternatively, in the liquid crystal display device according to the present disclosure, each of the layers of the liquid crystal composition according to the present disclosure has a thickness of 0.2 to 10.0 μm.

According to another aspect of the present disclosure, a method of manufacturing the liquid crystal display device according to the present disclosure is provided, which comprises:

a step of manufacturing a liquid crystal display panel: arranging a liquid crystal layer on a lower substrate, and arranging an upper substrate on the liquid crystal layer;

a step of forming a first transparent electrode by etching: forming a first transparent electrode having a grating structure on a light-exiting surface of the upper substrate by etching a transparent electrode layer;

a step of coating a liquid crystal composition layer: coating at least two layers of the liquid crystal composition according to the present disclosure on the first transparent electrode to form the liquid crystal composition layer;

a step of covering with a second transparent electrode: forming a second transparent electrode having a grating structure on one side of a transparent substrate facing the liquid crystal composition layer by etching another transparent electrode layer, and covering the liquid crystal composition layer with the transparent substrate having the etched second transparent electrode.

Alternatively, in the manufacturing method according to the present disclosure, each of the layers of the liquid crystal composition according to the present disclosure has a thickness of 0.2 to 10.0 μm.

The present disclosure produces advantageous effects as follows.

In the liquid crystal composition according to the present disclosure, the ethylene-vinyl acetate copolymer is a linear molecule with a high molecular weight and can form a network structure to anchor small molecules in the first composition. Therefore, the liquid crystal composition can be directly coated on the light-exiting surface of the substrate of the liquid crystal display panel to prevent flow of liquid crystals, thereby resulting in omission of the lower substrate arranged in the TN liquid crystal grating in a traditional barrier-type naked-eye 3D display device, reduction in the thickness of the liquid crystal display device and improvement in the transmittance in 2D display.

In the liquid crystal display device obtained according to the manufacturing method of the present disclosure, the liquid crystal composition according to the present disclosure is directly coated on the first transparent electrode on the light-exiting surface of the substrate of the liquid crystal display panel. The upper substrate, the first transparent electrode, the liquid crystal composition layer, the second transparent electrode, and the transparent substrate are equivalent to a liquid crystal grating. The liquid crystal grating shares the upper substrate with the liquid crystal display panel so that a layer of substrate is omitted, and the thickness of the liquid crystal display device is reduced, and thus the transmittance in the 2D display and the display effect are improved.

DETAILED DESCRIPTION

Embodiments are merely for illustrating the present disclosure, without forming limitations to the contents of the present disclosure. Below, the present disclosure will be further explained and described in combination with the drawings and embodiments.

According to one aspect of the present disclosure, a liquid crystal composition is provided, which comprises a first composition and an ethylene-vinyl acetate copolymer at a ratio by mass of the first composition to the ethylene-vinyl acetate copolymer of 2:3 to 4:1, wherein the first composition comprises 15 to 40 parts by weight of a chiral cholesterol ester compound, 59 to 75 parts by weight of nematic phase liquid crystal and 1 to 10 parts by weight of ferroferric oxide.

Figure 1:
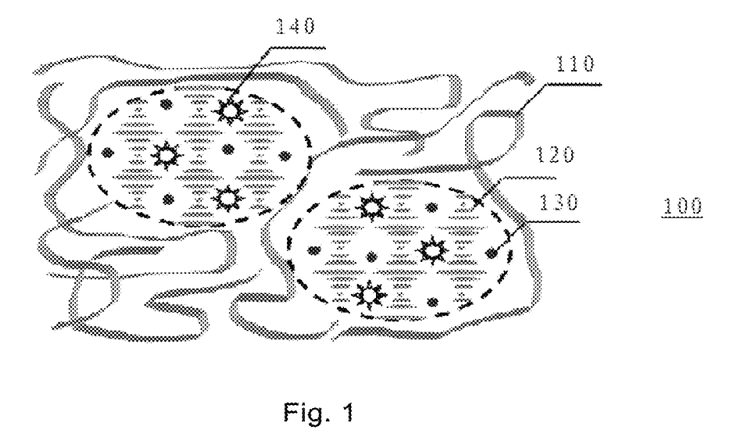
FIG. 1 is a structurally schematic view showing a liquid crystal composition according to the present disclosure.

As shown in FIG. 1, in the liquid crystal composition 100 according to the present disclosure, the ethylene-vinyl acetate copolymer 110 is a linear molecule with a high molecular weight and can form a network structure to anchor small molecules (nematic phase liquid crystal 120, chiral cholesterol ester compound 130, and ferroferric oxide nanometer particles 140) in the first composition. Therefore, the liquid crystal composition can be directly coated on the first transparent electrode on the light-exiting surface of the substrate of the liquid crystal display panel to prevent flow of liquid crystal, thereby resulting in omission of the lower substrate arranged in the TN liquid crystal grating in a traditional barrier-type naked-eye 3D display device, reduction in the thickness of the liquid crystal display device and improvement in the transmittance in 2D display.

Figure 2:
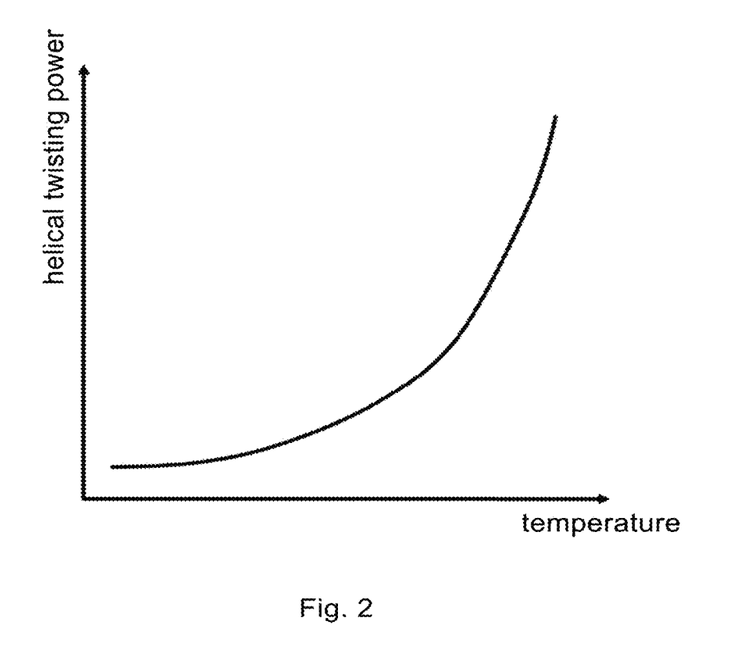
FIG. 2 is a curve of a helical twisting power of the chiral cholesterol ester compound varying with the temperature.
Figure 3:
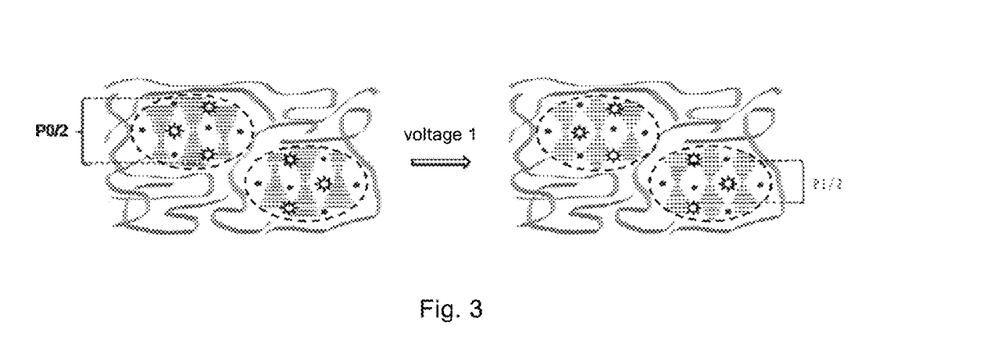
FIG. 3 is a schematic view showing a change in the helical pitch in a first layer of the composition before and after a voltage 1 is applied.
Figure 4:
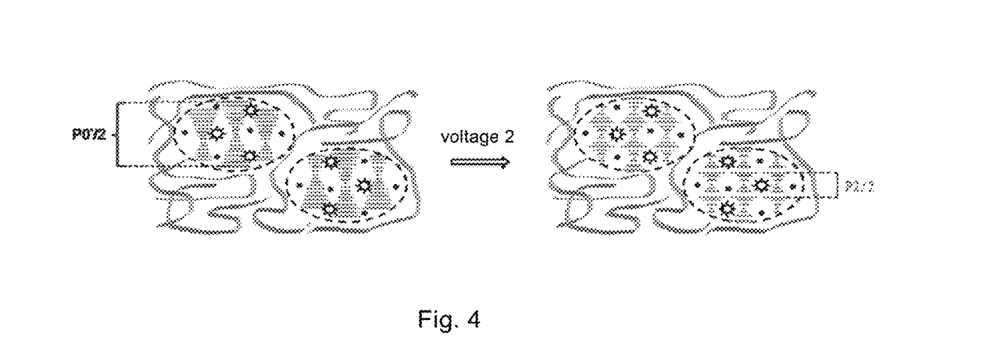
FIG. 4 is a schematic view showing a change in the helical pitch in a second layer of the composition before and after a voltage 2 is applied.

Components of the first composition cooperate with each other to achieve the switch from 2D display to 3D display. The detailed principle is as follows: as shown in FIG. 2, the helical twisting power of the chiral cholesterol ester compound 130 increases gradually with the temperature; a helical pitch of the liquid crystal composition comprising the chiral cholesterol ester compound thus decreases gradually; in the case where the liquid crystal composition is applied to a liquid crystal display device, at the room temperature, when no voltage is applied, the liquid crystal composition reflects IR light or light having a larger wavelength, and thus appears colorless and transparent, which corresponds to 2D display; when a voltage is applied, as shown in FIGS. 3 and 4, ferroferric oxide nanometer particles 140 convert electromagnetic energy into heat energy, which causes the temperature of the liquid crystal composition to increase, the helical twisting power of the chiral cholesterol ester compound 130 to increase, and the helical pitch of the liquid crystal composition to decrease, and thus visible light can be reflected by the liquid crystal composition. In FIGS. 3 and 4, the helical pitch decreases in different degrees with different voltages being applied. Two or more layers of the liquid crystal composition reflect visible lights with different colors which are superposed to appear black, and thus act as a liquid crystal grating and realize 3D display.

In the liquid crystal composition, the ethylene-vinyl acetate copolymer 110 is a compound represented by formula II:

formula II where the mass percentage of vinyl acetate is 5% to 50%.

In one embodiment of the liquid crystal composition according to the present disclosure, the chiral cholesterol ester compound is a compound represented by formula I:

formula I wherein n is an integer of 0 to 19, and an asterisk denotes a chiral center.

The compound represented by formula I is cholesteryl 4-alkoxybenzoate which has a feature that the helical twisting power increases with the temperature. The composition containing the compound has a helical pitch that decreases with the increasing temperature. In the liquid crystal composition according to the present disclosure, cholesterol fatty acid ester and cholesterol oleate can be used as the chiral cholesterol ester compound.

In one embodiment of the liquid crystal composition according to the present disclosure, the nematic phase liquid crystal is a positive small-molecule liquid crystal.

When a positive small-molecule liquid crystal is adopted to cooperate with other components of the composition, switch between 2D and 3D display can be realized. In the liquid crystal composition according to the present disclosure, a positive small-molecule liquid crystal, SLC1717 produced by SHIJIAZHUANG YONGSHENG HUATSIN, may be adopted.

Figure 5:
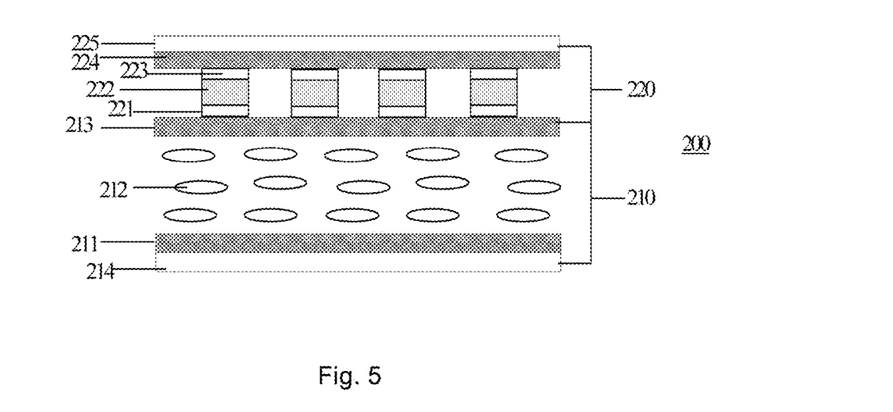
FIG. 5 is a liquid crystal display device of one embodiment according to the present disclosure.

As shown in FIG. 5, a liquid crystal display device 200 according to the present disclosure comprises: a liquid crystal display panel 210 that comprises an upper substrate 213, a lower substrate 211 and a liquid crystal layer 212 arranged between the upper substrate 213 and the lower substrate 211; a first transparent electrode 221 that is arranged on a light-exiting surface of the upper substrate 213; a liquid crystal composition layer 222 that is arranged on the first transparent electrode 221, wherein the liquid crystal composition is the liquid crystal composition according to the present disclosure; and a second transparent electrode 223 that is arranged on one side of a transparent substrate 224 facing the liquid crystal composition layer, the second transparent electrode 223 arranged on the transparent substrate 224 covering the liquid crystal composition layer 222.

As shown in FIG. 5, the upper substrate 213, the first transparent electrode 221, the liquid crystal composition layer 222, the second transparent electrode 223, and the transparent substrate 224 act as a liquid crystal grating, and the structure of these layers can also be regarded as a liquid crystal grating 220. As can be seen from FIG. 5, the liquid crystal grating 220 and the liquid crystal display panel 210 share the upper substrate 213, resulting in omission of one layer of substrate, and thus decrease in the thickness of the liquid crystal display device and improvement in the transmittance and the display effect of the 2D display.

Additionally, as shown in FIG. 5, in the liquid crystal display panel 210, a lower polarizer 214 is arranged in a layer below the lower substrate 211; and an upper polarizer 225 is arranged in a layer above the transparent substrate, and all of them constitute a complete liquid crystal display device.

Due to adoption of the liquid crystal composition according to the present disclosure, the liquid crystal display device according to the present disclosure can be manufactured to comprise a liquid crystal grating integrated in the liquid crystal display panel, resulting in omission of one layer of substrate and thus reduction in the thickness by at least 20 mm, thereby improving the transmittance in 2D display. Adoption of the liquid crystal composition according to the present disclosure can achieve switch between 2D and 3D display.

In one embodiment of the liquid crystal display device according to the present disclosure, the liquid crystal composition layer is prepared by coating at least two layers of composition according to the present disclosure.

In the liquid crystal display device according to the present disclosure, at least two layers of the liquid crystal composition are coated to enable colors reflected by them to be superposed so as to appear black, and thus act as a liquid crystal grating to realize 3D display.

In the liquid crystal display device according to the present disclosure, each of the coated layers of the liquid crystal composition has a thickness of 0.2 to 10.0 μm.

In the liquid crystal display device according to the present disclosure, at room temperature, the liquid crystal composition is enabled to reflect IR light or light with a larger wavelength when no voltage is applied, and to reflect visible light after a voltage is applied. The thickness of less than 0.2 μm will be not conducive to the coating of two layers of the composition, which will cause it difficult to realize the black; and the thickness of greater than 10.0 μm will affect the overall transmittance of the liquid crystal grating, and thus will affect the 2D display effect.

Figure 6:
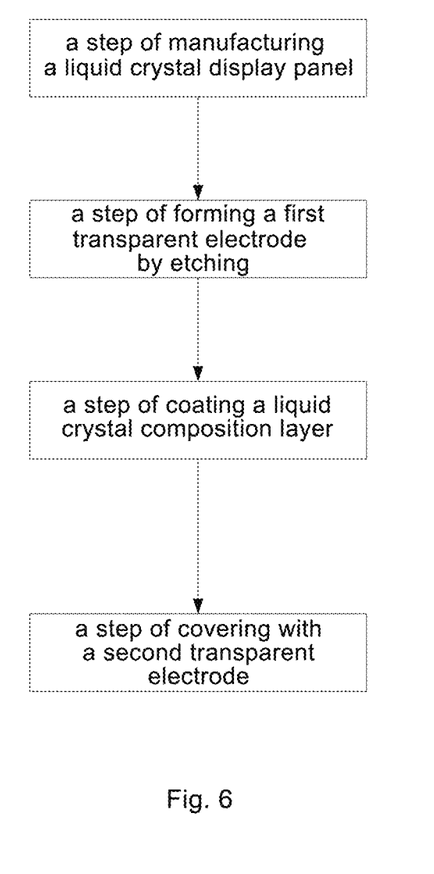
FIG. 6 is a flow diagram of the method of manufacturing a liquid crystal display device of one embodiment according to the present disclosure.

As shown in FIG. 6, a method of manufacturing the liquid crystal display device according to the present invention is provided. Firstly, a step of manufacturing a liquid crystal display panel is performed: arranging a liquid crystal layer on a lower substrate, and arranging an upper substrate on the liquid crystal layer. Then, a step of forming a first transparent electrode by etching is performed: forming a first transparent electrode having a grating structure on a light-exiting surface of the upper substrate by etching a transparent electrode layer. Subsequently, a step of coating a liquid crystal composition layer is performed: coating at least two layers of the liquid crystal composition on the first transparent electrode to form the liquid crystal composition layer. Finally, a step of covering with a second transparent electrode is performed: forming a second transparent electrode having a grating structure on one side of a transparent substrate facing the liquid crystal composition layer by etching another transparent electrode layer, and covering the liquid crystal composition layer with the transparent substrate having the etched second transparent electrode.

Additionally, an upper polarizer is arranged on the transparent substrate, and a lower polarizer is arranged on the lower substrate in the manufacturing process.

In the manufacturing method according to the present disclosure, the liquid crystal composition according to the present disclosure is adopted. The liquid crystal composition is directly coated on the first transparent electrode etched on the light-exiting surface of the substrate of the liquid crystal display panel to prevent the flow of liquid crystal, thereby resulting in omission of the lower substrate of the TN liquid crystal grating in a traditional barrier-type naked-eye 3D display device, reduction in the thickness of the display device, and improvement in the transmittance in 2D display. Components of the first composition cooperate with each other to realize the switch between 2D display and 3D display.

In one embodiment of the manufacturing method according to the present disclosure, each of the layers of the liquid crystal composition according to the present disclosure has a thickness of 0.2 to 10.0 μm.

In the manufacturing method according to the present disclosure, when each of the coated liquid crystal composition layers is controlled to have a thickness of 0.2 to 10 μm, at room temperature, the liquid crystal display device is enabled to reflect IR light or light with a larger wavelength when no voltage is applied, so as to realize 2D display, and to reflect visible light when a voltage is applied, so as to realize 3D display. When each of the liquid crystal composition layers has a thickness of less than 0.2 μm, this will not be conducive to the coating of two layers of the liquid crystal composition and will make it difficult to realize the black; and when each of the liquid crystal composition layers has a thickness of greater than 10.0 μm, this will affect the overall transmittance of the liquid crystal grating and thus will affect the 2D display effect.

It can therefore be seen that there are many optional factors for the liquid crystal composition, the liquid crystal display device and its manufacturing method according to the present disclosure. Different examples can be derived from the claims of the present disclosure, but examples according to the present disclosure are merely for illustrating the present disclosure, and are not intended to limit the present disclosure. Below, the present disclosure will be described by way of examples.

EXAMPLE 1

The liquid crystal composition according to the present disclosure comprises a first composition and an ethylene-vinyl acetate copolymer at a ratio by mass of the first composition to the ethylene-vinyl acetate copolymer of 2:3. The first composition comprises 15 parts by weight of a chiral cholesterol ester compound, 59 parts by weight of nematic phase liquid crystal and 1 part by weight of ferroferric oxide. The chiral cholesterol ester compound is a compound represented by formula I where n is 0. The nematic phase liquid crystal is a positive small-molecule liquid crystal, SLC1717 (purchased from SHIJIAZHUANG YONGSHENG HUATSIN). The liquid crystal composition according to the present disclosure is prepared by mixing the first composition and the ethylene-vinyl acetate copolymer.

EXAMPLE 2

The liquid crystal composition according to the present disclosure comprises a first composition and an ethylene-vinyl acetate copolymer at a ratio by mass of the first composition to the ethylene-vinyl acetate copolymer of 4:1. The first composition comprises 40 parts by weight of a chiral cholesterol ester compound, 75 parts by weight of nematic phase liquid crystal and 10 parts by weight of ferroferric oxide. The chiral cholesterol ester compound is a compound represented by formula I where n is 19. The nematic phase liquid crystal is a positive small-molecule liquid crystal, SLC1717 (purchased from SHIJIAZHUANG YONGSHENG HUATSIN). The liquid crystal composition according to the present disclosure is prepared by mixing the first composition and the ethylene-vinyl acetate copolymer.

EXAMPLE 3

The liquid crystal composition according to the present disclosure comprises a first composition and an ethylene-vinyl acetate copolymer at a ratio by mass of the first composition to the ethylene-vinyl acetate copolymer of 1:1. The first composition comprises 25 parts by weight of a chiral cholesterol ester compound, 71 parts by weight of nematic phase liquid crystal and 4 parts by weight of ferroferric oxide. The chiral cholesterol ester compound is a compound represented by formula I where n is 2. The nematic phase liquid crystal is a positive small-molecule liquid crystal, SLC1717 (purchased from SHIJIAZHUANG YONGSHENG HUATSIN). The liquid crystal composition according to the present disclosure is prepared by mixing the first composition and the ethylene-vinyl acetate copolymer.

EXAMPLE 4

The liquid crystal composition according to the present disclosure comprises a first composition and an ethylene-vinyl acetate copolymer at a ratio by mass of the first composition to the ethylene-vinyl acetate copolymer of 2:3. The first composition comprises 20 parts by weight of a chiral cholesterol ester compound, 77 parts by weight of nematic phase liquid crystal and 3 parts by weight of ferroferric oxide. The chiral cholesterol ester compound is a compound represented by formula I where n is 5. The nematic phase liquid crystal is a positive small-molecule liquid crystal, SLC1717 (purchased from SHIJIAZHUANG YONGSHENG HUATSIN). The liquid crystal composition according to the present disclosure is prepared by mixing the first composition and the ethylene-vinyl acetate copolymer.

EXAMPLE 5

The liquid crystal composition according to the present disclosure comprises a first composition and an ethylene-vinyl acetate copolymer at a ratio by mass of the first composition to the ethylene-vinyl acetate copolymer of 3:2. The first composition comprises 15 parts by weight of a chiral cholesterol ester compound, 80 parts by weight of nematic phase liquid crystal and 5 parts by weight of ferroferric oxide. The chiral cholesterol ester compound is a compound represented by formula I where n is 5, and the nematic phase liquid crystal is a positive small-molecule liquid crystal, SLC1717 (purchased from SHIJIAZHUANG YONGSHENG HUATSIN). The liquid crystal composition according to the present disclosure is prepared by mixing the first composition and the ethylene-vinyl acetate copolymer.

All liquid crystal compositions prepared in the examples 1-5 according to the present disclosure can be used for manufacturing a 3D liquid crystal display device. In the liquid crystal compositions of examples 1-5, the ethylene-vinyl acetate copolymer is a linear molecule with a high molecular weight, and can form a network structure to anchor small molecules in the first composition. Therefore, the liquid crystal composition can be directly coated on a first substrate on the light-exiting surface of the liquid crystal display panel to prevent flow of liquid crystals, thereby resulting in omission of the lower substrate of the TN liquid crystal grating in a traditional barrier-type naked-eye 3D display device. Thus the thickness of the display device is reduced, and the transmittance in 2D display is improved.

The components of the first composition cooperate with each other to realize the switch between 2D display and 3D display. A detailed principle is as follows.

As can be seen from FIG. 2, the helical twisting power of the chiral cholesterol ester compound 130 increases gradually with the increasing temperature, and a helical pitch of the composition comprising the chiral cholesterol ester compound thus decreases gradually with the increasing temperature. In the case where the composition is applied to a liquid crystal display device, at the room temperature, when no voltage is applied, the composition reflects IR light or light having a larger wavelength, and appears colorless and transparent, which corresponds to 2D display. In the case where the composition is applied to a liquid crystal display device, at the room temperature, when a voltage is applied, as shown in FIGS. 3 and 4, ferroferric oxide nanometer particles 140 convert electromagnetic energy into heat energy, which causes the temperature of the liquid crystal composition to increase, the helical twisting power of the chiral cholesterol ester compound 130 to increase, and the helical pitch of the composition to decrease, and thus visible light can be reflected by the liquid crystal composition. In FIGS. 3 and 4, the helical pitch decreases in different degrees with different voltages being applied, and two layers of the composition reflect visible lights with different colors which are superposed to appear black, and thus act as a liquid crystal grating and realize 3D display.

The method of manufacturing a liquid crystal display device is described below in combination with the compositions in examples 3-5.

EXAMPLE 6

As shown in FIG. 6, a method of manufacturing a liquid crystal display device according to the present disclosure is provided. Firstly, a step of manufacturing a liquid crystal display panel is performed: arranging a liquid crystal layer on a lower substrate, and arranging an upper substrate on the liquid crystal layer. Then, a step of forming a first transparent electrode by etching is performed: forming a first transparent electrode having a grating structure on a light-exiting surface of the upper substrate by etching a transparent electrode layer. Subsequently, a step of coating a liquid crystal composition layer is performed: coating one layer of the liquid crystal composition obtained in the example 3, which has a thickness of 0.3 µm, on the first transparent electrode to form a first layer of the liquid crystal composition, and then coating another layer of the liquid crystal composition obtained in the example 3, which has a thickness of 0.5 µm, on the first layer of the liquid crystal composition. Finally, a step of covering with a second transparent electrode is performed: forming a second transparent electrode having a grating structure on one side of a transparent substrate facing the liquid crystal composition layer by etching another transparent electrode layer, and covering the liquid crystal composition layer with the transparent substrate having the etched second transparent electrode. The manufacturing of the liquid crystal display device is completed.

At room temperature, when no voltage is applied to the liquid crystal display device obtained in example 6, the liquid crystal composition has a helical pitch of 1.15 µm, can reflect IR light with a wavelength of 2100 nm, and appears colorless and transparent, so as to realize 2D display. When a voltage is applied to the liquid crystal display device obtained in example 6, ferroferric oxide nanometer particles in the mixture convert electromagnetic energy into heat energy, which causes the temperature of the liquid crystal composition to increase, the helical twisting power of the chiral cholesterol ester compound to increase, and accordingly the helical pitch of the liquid crystal composition to decrease, and thus visible light with a wavelength in a certain range can be reflected. By adjusting the voltage, the first layer of the liquid crystal composition is caused to reflect red light, and the second layer of the liquid crystal composition reflect blue light, which are superposed to appear black so that the liquid crystal composition layers act as a liquid crystal grating to realize 3D display.

EXAMPLE 7

As shown in FIG. 6, a method of manufacturing a liquid crystal display device according to the present disclosure is provided. Firstly, a step of manufacturing a liquid crystal display panel is performed: arranging a liquid crystal layer on a lower substrate, and arranging an upper substrate on the liquid crystal layer. Then, a step of forming a first transparent electrode by etching is performed: forming a first transparent electrode having a grating structure on a light-exiting surface of the upper substrate by etching a transparent electrode layer. Subsequently, a step of coating a liquid crystal composition layer is performed: coating one layer of the liquid crystal composition obtained in the example 4, which has a thickness of 0.8 µm, on the first transparent electrode to form a first layer of the liquid crystal composition, and then coating another layer of the liquid crystal composition obtained in the example 4, which has a thickness of 0.6 µm, on the first layer of the liquid crystal composition. Finally, a step of covering with a second transparent electrode is performed: forming a second transparent electrode having a grating structure on one side of a transparent substrate facing the liquid crystal composition layer by etching another transparent electrode layer, and covering the liquid crystal composition layer with the transparent substrate having the etched second transparent electrode. The manufacturing of the liquid crystal display device is completed.

At room temperature, when no voltage is applied to the liquid crystal display device obtained in example 7, the liquid crystal composition has a helical pitch of 1.0 μm, can reflect IR light with a wavelength of 1720 nm, and appears colorless and transparent, so as to realize 2D display. When a voltage is applied to the liquid crystal display device obtained in example 7, ferroferric oxide nanometer particles in the liquid crystal composition convert electromagnetic energy into heat energy, which causes the temperature of the liquid crystal composition to increase, the helical twisting power of the chiral cholesterol ester compound to increase, and accordingly the helical pitch of the composition to decrease, and thus visible light with a wavelength in a certain range can be reflected. By adjusting the voltage, the first layer of the liquid crystal composition is caused to reflect green light, and the second layer of the liquid crystal composition is caused to reflect purple light, which are superposed to appear black so that the liquid crystal composition layers act as a liquid crystal grating to realize 3D display.

EXAMPLE 8

As shown in FIG. 6, a method of manufacturing a liquid crystal display device according to the present disclosure is provided. Firstly, a step of manufacturing a liquid crystal display panel is performed: arranging a liquid crystal layer on a lower substrate, and arranging an upper substrate on the liquid crystal layer. Then, a step of forming a first transparent electrode by etching is performed: forming a first transparent electrode having a grating structure on a light-exiting surface of the upper substrate by etching a transparent electrode layer. Subsequently, a step of coating a liquid crystal composition layer is performed: coating one layer of the liquid crystal composition obtained in the example 5, which has a thickness of 0.3 μm, on the first transparent electrode to form a first layer of the liquid crystal composition, and then coating another layer of the liquid crystal composition obtained in the example 5, which has a thickness of 0.5 μm on the first layer of the liquid crystal composition. Finally, a step of covering with a second transparent electrode is performed: forming a second transparent electrode having a grating structure on one side of a transparent substrate facing the liquid crystal composition layer by etching a transparent electrode layer, and covering the liquid crystal composition layer with the transparent substrate having the etched second transparent electrode. The manufacturing of a liquid crystal display device is completed.

At room temperature, when no voltage is applied to the liquid crystal display device obtained in example 8, the composition has a helical pitch of 1.5 μm, can reflect IR light with a wavelength of 2580 nm, and appears colorless and transparent, so as to realize 2D display. When a voltage is applied to the liquid crystal display device obtained in example 8, ferroferric oxide nanometer particles in the liquid crystal composition convert electromagnetic energy into heat energy, which causes the temperature of the liquid crystal composition to be increase, the helical twisting power of the chiral cholesterol ester compound to increase, and accordingly the helical pitch of the composition to decrease, and thus visible light with a wavelength in a certain range can be reflected. By adjusting the voltage, the first layer of the liquid crystal composition is caused to reflect green light, and the second layer of the liquid crystal composition is caused to reflect purple light, which are superposed to appear black so that the liquid crystal composition layers act as a liquid crystal grating to realize 3D display.

A liquid crystal display device 200 according to the present disclosure as shown in FIG. 5 is obtained according to examples 6-8 of the present disclosure, and comprises: a liquid crystal display panel 210 that comprises an upper substrate 213, a lower substrate 211 and a liquid crystal layer 212 arranged between the upper substrate 213 and the lower substrate 211; a first transparent electrode 221 that is etched on a light-exiting surface of the upper substrate 213; a liquid crystal composition layer 222 that is coated on the first transparent electrode 221, wherein the liquid crystal composition is the liquid crystal composition according to the present disclosure; and a second transparent electrode 223 that is etched on a transparent substrate 224, the second transparent electrode 223 etched on the transparent substrate 224 covering the liquid crystal composition layer 222.

As shown in FIG. 5, the upper substrate 213, the first transparent electrode 221, the liquid crystal composition layer 222, the second transparent electrode 223, and the transparent substrate 224 act as a liquid crystal grating, and the structure of these layers can also be regarded as a liquid crystal grating 220. As can be seen from FIG. 5, the liquid crystal grating 220 and the liquid crystal display panel 210 share the upper substrate 213, resulting in omission of one layer of substrate. Thus the thickness of the liquid crystal display device is decreased and the transmittance and the display effect of the 2D display is improved.

It is obvious that a person skilled in the art may make various modifications and variations to the present disclosure without departing from the spirit and scope of the present disclosure. In this way, if such modifications and variations of the present disclosure fall within the scope of the appended claims and equivalents thereof, the present disclosure also intends to include them.

What is claimed is:

1. A liquid crystal composition which comprises a first composition and an ethylene-vinyl acetate copolymer at a ratio by mass of the first composition to the ethylene-vinyl acetate copolymer of 2:3 to 4:1, wherein the first composition comprises 15 to 40 parts by weight of a chiral cholesterol ester compound, 59 to 75 parts by weight of nematic phase liquid crystal, and 1 to 10 parts by weight of ferroferric oxide.

2. The liquid crystal composition according to claim 1, wherein the chiral cholesterol ester compound is a compound represented by formula I:

formula I wherein n is an integer of 0 to 19, and an asterisk * denotes a chiral center.

3. The liquid crystal composition according to claim 1, wherein the nematic phase liquid crystal is a positive small-molecule liquid crystal.

4. A liquid crystal display device, wherein the liquid crystal display device comprises:
   a liquid crystal display panel that comprises an upper substrate, a lower substrate, and a liquid crystal layer located between the upper substrate and the lower substrate;
   a first transparent electrode that is arranged on a light-exiting surface of the upper substrate;
   a liquid crystal composition layer that is arranged on the first transparent electrode and comprises the liquid crystal composition according to claim 1; and
   a second transparent electrode that is arranged on one side of a transparent substrate facing the liquid crystal composition layer and covers the liquid crystal composition layer.

5. The liquid crystal display device according to claim 4, wherein the chiral cholesterol ester compound is a compound represented by formula I:

formula I wherein n is an integer of 0 to 19, and an asterisk * denotes a chiral center.

6. The liquid crystal display device according to claim 4, wherein the nematic phase liquid crystal is a positive small-molecule liquid crystal.

7. The liquid crystal display device according to claim 4, wherein the liquid crystal composition layer is prepared by coating at least two layers of the liquid crystal composition according to of claim 1.

8. The liquid crystal display device according to claim 7, wherein the chiral cholesterol ester compound is a compound represented by formula I:

formula I wherein n is an integer of 0 to 19, and an asterisk * denotes a chiral center.

9. The liquid crystal display device according to claim 7, wherein the nematic phase liquid crystal is a positive small-molecule liquid crystal.

10. The liquid crystal display device according to claim 7, wherein each of the layers of the liquid crystal composition according to claim 1 has a thickness of 0.2 to 10.0 μm.

11. The liquid crystal display device according to claim 10, wherein the chiral cholesterol ester compound is a compound represented by formula I:

formula I wherein n is an integer of 0 to 19, and an asterisk * denotes a chiral center.

12. The liquid crystal display device according to claim 10, wherein the nematic phase liquid crystal is a positive small-molecule liquid crystal.

13. A method of manufacturing the liquid crystal display device according to claim 4, comprising:

a step of manufacturing a liquid crystal display panel: arranging a liquid crystal layer on a lower substrate, and arranging an upper substrate on the liquid crystal layer;

a step of forming a first transparent electrode by etching: forming a first transparent electrode having a grating structure on a light-exiting surface of the upper substrate by etching a transparent electrode layer;

a step of coating a liquid crystal composition layer: coating at least two layers of the liquid crystal composition according to claim 1 on the first transparent electrode to form the liquid crystal composition layer; and a step of covering with a second transparent electrode: forming a second transparent electrode having a grating structure on one side of a transparent substrate facing the liquid crystal composition layer by etching another transparent electrode layer, and covering the liquid crystal composition layer with the transparent substrate having the etched second transparent electrode.

14. The method according to claim 13, wherein the chiral cholesterol ester compound is a compound represented by formula I:

formula I wherein n is an integer of 0 to 19, and an asterisk * denotes a chiral center.

15. The method according to claim 13, wherein the nematic phase liquid crystal is a positive small-molecule liquid crystal.

16. The method according to claim 13, wherein each of the layers of the liquid crystal composition according to claim 1 has a thickness of 0.2 to 10.0 μm.

17. The method according to claim 16, wherein the chiral cholesterol ester compound is a compound represented by formula I:

formula I wherein n is an integer of 0 to 19, and an asterisk * denotes a chiral center.

18. The method according to claim 16, wherein the nematic phase liquid crystal is a positive small-molecule liquid crystal.

* * * * *